United States Patent
Gordon et al.

(10) Patent No.: US 10,320,033 B2
(45) Date of Patent: Jun. 11, 2019

(54) ALKALI METAL ION BATTERY USING ALKALI METAL CONDUCTIVE CERAMIC SEPARATOR

(75) Inventors: John Howard Gordon, Salt Lake City, UT (US); Sai Bhavaraju, West Jordan, UT (US)

(73) Assignee: ENLIGHTEN INNOVATIONS INC., Calgary (CA)

( * ) Notice: Subject to any disclaimer, the term of this patent is extended or adjusted under 35 U.S.C. 154(b) by 667 days.

(21) Appl. No.: 13/466,844

(22) Filed: May 8, 2012

(65) Prior Publication Data

US 2012/0235644 A1 Sep. 20, 2012

Related U.S. Application Data

(63) Continuation-in-part of application No. 12/022,381, filed on Jan. 30, 2008, and a continuation-in-part of application No. 13/364,169, filed on Feb. 1, 2012.
(Continued)

(51) Int. Cl.
*H01M 10/54* (2006.01)
*H01M 10/36* (2010.01)
*H01M 10/39* (2006.01)

(52) U.S. Cl.
CPC ......... *H01M 10/36* (2013.01); *H01M 10/39* (2013.01); *Y10T 29/49108* (2015.01)

(58) Field of Classification Search
CPC ........ H01M 6/14; H01M 6/24; H01M 10/054; H01M 10/0561; H01M 10/36
See application file for complete search history.

(56) References Cited

U.S. PATENT DOCUMENTS 1,501,756 A 7/1924 Downs
3,546,021 A 12/1970 Gale
(Continued)

FOREIGN PATENT DOCUMENTS

EP 2935655 10/2015
EP 2973832 1/2016
(Continued)

OTHER PUBLICATIONS

Yoshimura, et al., "IPDL Machine Translation of JP-2001-307709", IPDL Machine Translation of JP-2001-307709, (Nov. 2, 2001), 1-12.
(Continued)

*Primary Examiner* — Ula C Ruddock
*Assistant Examiner* — Thomas H. Parsons
(74) *Attorney, Agent, or Firm* — Foley & Lardner LLP (57) ABSTRACT

A battery having a first electrode and a second electrode. The first electrode is made of metal and the second electrode is made of an oxidized material that is capable of being electrochemically reduced by the metal of the first electrode. An alkali-ion conductive, substantially non-porous separator is disposed between the first and second electrode. A first electrolyte contacts the first electrode. The first electrolyte includes a solvent which is non-reactive with the metal, and a salt bearing an alkali ion that may be conducted through the separator, wherein the salt is at least partially soluble in the solvent. A second electrolyte is also used. The second electrolyte contacts the second electrode. The second electrolyte at least partially dissolves the salt that forms upon the oxidized material being electrochemically reduced.

14 Claims, 4 Drawing Sheets

Related U.S. Application Data (60) Provisional application No. 61/484,406, filed on May 10, 2011.

(56) References Cited

U.S. PATENT DOCUMENTS

| | | |
|---|---|---|
| 3,660,170 A | 5/1972 | Rampel |
| 3,785,965 A | 1/1974 | Welty |
| 3,787,315 A | 1/1974 | Bearden, Jr. et al. |
| 3,788,978 A | 1/1974 | Bearden, Jr. et al. |
| 3,791,966 A | 2/1974 | Bearden |
| 3,970,472 A | 7/1976 | Steffensen |
| 4,020,246 A | 4/1977 | Seo et al. |
| 4,041,215 A | 8/1977 | Kormanyos et al. |
| 4,053,371 A | 10/1977 | Towsley et al. |
| 4,076,613 A | 2/1978 | Bearden, Jr. |
| 4,162,351 A | 7/1979 | Putt et al. |
| 4,182,797 A | 1/1980 | Kondo et al. |
| 4,207,391 A | 6/1980 | Church et al. |
| 4,225,656 A * | 9/1980 | Lunden .......... H01M 6/185 29/623.1 |
| 4,244,986 A | 1/1981 | Paruso et al. |
| 4,298,666 A | 11/1981 | Taskier |
| 4,307,164 A * | 12/1981 | Church et al. ............ 429/207 |
| 4,372,823 A | 2/1983 | Church et al. |
| 4,375,501 A | 3/1983 | Peled et al. |
| 4,427,747 A | 1/1984 | Bennett et al. |
| 4,465,744 A | 8/1984 | Susman et al. |
| 4,479,856 A | 10/1984 | Ando |
| 4,485,154 A | 11/1984 | Remick et al. |
| 4,542,444 A | 9/1985 | Boland |
| 4,546,055 A | 10/1985 | Coetzer et al. |
| 4,579,796 A | 4/1986 | Muramatsu |
| 4,623,597 A | 11/1986 | Sapru et al. |
| 4,753,858 A | 6/1988 | Jow et al. |
| 4,828,939 A | 5/1989 | Turley et al. |
| 4,842,963 A | 6/1989 | Ross, Jr. et al. |
| 4,937,155 A | 6/1990 | Tokoi et al. |
| 5,051,325 A | 9/1991 | Shishikura et al. |
| 5,057,206 A | 10/1991 | Engel et al. |
| 5,139,897 A | 8/1992 | Wedlake |
| 5,213,908 A | 5/1993 | Hagedorn |
| 5,264,298 A | 11/1993 | Townsend |
| 5,290,405 A * | 3/1994 | Joshi et al. .............. 205/338 |
| 5,342,709 A | 8/1994 | Yahnke et al. |
| 5,422,197 A | 6/1995 | Zito |
| 5,427,873 A | 6/1995 | Shuster |
| 5,516,598 A | 5/1996 | Visco et al. |
| 5,525,442 A | 6/1996 | Shuster |
| 5,541,019 A | 7/1996 | Anani et al. |
| 5,552,244 A | 9/1996 | Griffin et al. |
| 5,563,006 A | 10/1996 | Von Benda et al. |
| 5,580,430 A | 12/1996 | Balagopal et al. |
| 5,604,053 A | 2/1997 | Coetzer et al. |
| 5,648,183 A | 7/1997 | Licht et al. |
| 5,674,639 A | 10/1997 | Urry |
| 5,686,201 A | 11/1997 | Chu |
| 5,695,632 A | 12/1997 | Brons et al. |
| 5,780,186 A | 7/1998 | Casey, Jr. |
| 5,856,047 A | 1/1999 | Venkatesan et al. |
| 5,882,812 A | 3/1999 | Visco et al. |
| 5,935,421 A | 8/1999 | Brons et al. |
| 6,017,651 A | 1/2000 | Nimon et al. |
| 6,025,094 A | 2/2000 | Visco et al. |
| 6,030,720 A * | 2/2000 | Chu et al. .............. 429/105 |
| 6,033,343 A | 3/2000 | Licht |
| 6,033,796 A * | 3/2000 | Baji .......... H01M 6/24 429/101 |
| 6,110,236 A | 8/2000 | Tsang et al. |
| 6,153,328 A | 11/2000 | Colborn |
| 6,159,634 A | 12/2000 | Yen et al. |
| 6,165,644 A | 12/2000 | Nimon et al. |
| 6,200,704 B1 | 3/2001 | Katz et al. |
| 6,210,564 B1 | 4/2001 | Brons et al. |
| 6,210,832 B1 | 4/2001 | Visco et al. |
| 6,214,061 B1 | 4/2001 | Visco et al. |
| 6,225,002 B1 | 5/2001 | Nimon et al. |
| 6,248,476 B1 | 6/2001 | Sun et al. |
| 6,248,481 B1 | 6/2001 | Visco et al. |
| 6,265,100 B1 | 7/2001 | Saaski et al. |
| 6,270,923 B1 * | 8/2001 | Bito .......... H01M 4/136 429/218.1 |
| 6,291,090 B1 | 9/2001 | Kuznetsov et al. |
| 6,310,960 B1 | 10/2001 | Saaski et al. |
| 6,355,379 B1 | 3/2002 | Ohshita et al. |
| 6,358,643 B1 | 3/2002 | Katz et al. |
| 6,368,486 B1 | 4/2002 | Thompson et al. |
| 6,376,123 B1 | 4/2002 | Chu |
| 6,402,795 B1 | 6/2002 | Chu et al. |
| 6,410,181 B1 | 6/2002 | Spillman et al. |
| 6,413,284 B1 | 7/2002 | Chu et al. |
| 6,413,285 B1 | 7/2002 | Chu et al. |
| 6,416,903 B1 | 7/2002 | Fierro et al. |
| 6,432,584 B1 | 8/2002 | Visco et al. |
| 6,537,701 B1 | 3/2003 | Nimon et al. |
| 6,610,440 B1 | 8/2003 | LaFollette et al. |
| 6,632,573 B1 | 10/2003 | Nimon et al. |
| 6,737,197 B2 | 5/2004 | Chu et al. |
| 6,787,019 B2 | 9/2004 | Jacobson et al. |
| 6,852,450 B2 | 2/2005 | Hwang et al. |
| 6,881,234 B2 | 4/2005 | Towsley |
| 6,911,280 B1 | 6/2005 | De Jonghe et al. |
| 6,955,753 B1 | 10/2005 | Gomez |
| 6,955,866 B2 | 10/2005 | Nimon et al. |
| 6,991,662 B2 | 1/2006 | Visco et al. |
| 7,070,632 B1 | 7/2006 | Visco et al. |
| 7,144,654 B2 | 12/2006 | LaFollette et al. |
| 7,166,384 B2 | 1/2007 | LaFollette et al. |
| 7,214,443 B2 | 5/2007 | Clarke et al. |
| 7,259,126 B2 | 8/2007 | Gordon et al. |
| 7,273,680 B2 * | 9/2007 | Durkot .......... H01M 2/0272 429/206 |
| 7,282,295 B2 | 10/2007 | Visco et al. |
| 7,282,296 B2 | 10/2007 | Visco et al. |
| 7,282,302 B2 | 10/2007 | Visco et al. |
| 7,314,681 B2 * | 1/2008 | Randell .......... H01M 2/0202 429/164 |
| 7,390,591 B2 | 6/2008 | Visco et al. |
| 7,432,017 B2 | 10/2008 | Visco et al. |
| 7,482,096 B2 | 1/2009 | De Jonghe et al. |
| 7,491,458 B2 | 2/2009 | Visco et al. |
| 8,012,621 B2 | 9/2011 | Joshi et al. |
| 8,088,270 B2 | 1/2012 | Gordon et al. |
| 8,168,321 B2 * | 5/2012 | Shelekhin .......... H01M 2/16 29/623.1 |
| 8,883,339 B2 * | 11/2014 | Choi ............ 429/105 |
| 8,968,902 B2 | 3/2015 | Coors et al. |
| 2002/0150818 A1 | 10/2002 | Amatucci et al. |
| 2002/0172871 A1 | 11/2002 | Schucker |
| 2003/0108788 A1 | 6/2003 | Miyoshi et al. |
| 2004/0065543 A1 | 4/2004 | Kovarsky |
| 2004/0197641 A1 | 10/2004 | Visco et al. |
| 2004/0229107 A1 | 11/2004 | Smedley |
| 2005/0006252 A1 | 1/2005 | Korpel et al. |
| 2005/0016857 A1 | 1/2005 | Kovarsky et al. |
| 2005/0054525 A1 | 3/2005 | Ovshinsky et al. |
| 2005/0064274 A1 | 3/2005 | Reichman et al. |
| 2005/0109617 A1 | 5/2005 | Ono et al. |
| 2005/0175890 A1 | 8/2005 | Tsutsumi et al. |
| 2005/0175894 A1 | 8/2005 | Visco et al. |
| 2005/0260460 A1 | 11/2005 | Kishi et al. |
| 2006/0096893 A1 | 5/2006 | De Almeida et al. |
| 2006/0141346 A1 | 6/2006 | Gordon et al. |
| 2006/0177732 A1 | 8/2006 | Visco et al. |
| 2006/0226022 A1 | 10/2006 | Balagopal et al. |
| 2006/0257734 A1 | 11/2006 | Obata et al. |
| 2007/0048610 A1 | 3/2007 | Tsang et al. |
| 2007/0048617 A1 | 3/2007 | Inda |
| 2007/0154762 A1 | 7/2007 | Schucker |
| 2007/0172739 A1 | 7/2007 | Visco et al. |
| 2007/0221265 A1 | 9/2007 | Affinito et al. |
| 2007/0259235 A1 | 11/2007 | Jacobson et al. |
| 2008/0268327 A1 | 10/2008 | Gordon et al. |
| 2009/0061288 A1 | 3/2009 | Gordon et al. |

(56) References Cited

U.S. PATENT DOCUMENTS

| | | | |
|---|---|---|---|
| 2009/0134040 | A1 | 5/2009 | Gordon et al. |
| 2009/0134842 | A1 | 5/2009 | Joshi et al. |
| 2009/0136830 | A1 | 5/2009 | Gordon |
| 2009/0189567 | A1 | 6/2009 | Joshi et al. |
| 2009/0212743 | A1 | 8/2009 | Hagiwara et al. |
| 2010/0044241 | A1 | 2/2010 | Pendleton et al. |
| 2010/0068629 | A1 | 3/2010 | Gordon |
| 2010/0089762 | A1 | 4/2010 | Gordon |
| 2010/0239893 | A1 | 9/2010 | Gordon et al. |
| 2010/0261051 | A1 | 10/2010 | Okada et al. |
| 2010/0285372 | A1 | 11/2010 | Lee et al. |
| 2011/0057153 | A1 | 3/2011 | Cha et al. |
| 2011/0104526 | A1 | 5/2011 | Boxley et al. |
| 2012/0015256 | A1 | 1/2012 | Komaba et al. |
| 2012/0021273 | A1 | 1/2012 | Ohmori et al. |
| 2012/0040274 | A1 | 2/2012 | Gordon |
| 2012/0045695 | A1 | 2/2012 | Sheem et al. |
| 2012/0061823 | A1 | 3/2012 | Wu et al. |
| 2012/0126752 | A1 | 5/2012 | Joshi et al. |
| 2012/0141856 | A1 | 6/2012 | Gordon et al. |
| 2012/0164524 | A1 | 6/2012 | Bogdan et al. |
| 2012/0214043 | A1 | 8/2012 | Olschimke et al. |
| 2012/0219833 | A1 | 8/2012 | Coors et al. |
| 2012/0219838 | A1 | 8/2012 | Coors et al. |
| 2012/0219843 | A1 | 8/2012 | Bogdan et al. |
| 2013/0052525 | A1 | 2/2013 | Kageura et al. |
| 2013/0130085 | A1 | 5/2013 | Choi |
| 2013/0196224 | A1 | 8/2013 | Kim et al. |
| 2014/0170443 | A1 | 6/2014 | Bhavaraju et al. |

FOREIGN PATENT DOCUMENTS

| | | | |
|---|---|---|---|
| FR | 2301108 | | 9/1976 |
| FR | 2518320 | | 6/1983 |
| GB | 1361377 | * | 7/1974 |
| GB | 21599661 | | 12/1985 |
| JP | 59-75985 | | 4/1984 |
| JP | 5975985 | | 4/1984 |
| JP | 62186470 | | 8/1987 |
| JP | 07-282860 | A | 10/1995 |
| JP | 08-507637 | A | 8/1996 |
| JP | 08321322 | A | 12/1996 |
| JP | 10162807 | | 6/1998 |
| JP | 2001-307709 | | 11/2001 |
| JP | 2001307709 | | 11/2001 |
| JP | 2002-245847 | A | 8/2002 |
| JP | 2013-541825 | A | 11/2003 |
| JP | 2005-322551 | A | 11/2005 |
| JP | 2008-293678 | A | 12/2008 |
| JP | 2008293678 | | 12/2008 |
| JP | 2008300173 | | 12/2008 |
| JP | 201181971 | | 4/2011 |
| JP | 09-508490 | A | 8/2017 |
| KR | 2004047664 | | 6/2004 |
| KR | 100651246 | | 8/2005 |
| KR | 20070021110 | | 2/2007 |
| KR | 20070021110 | A | 2/2007 |
| KR | 2007028588 | | 3/2007 |
| WO | WO2012061823 | | 8/1992 |
| WO | WO9416468 | | 7/1994 |
| WO | WO-2005/038953 | | 4/2005 |
| WO | WO2005038953 | | 4/2005 |
| WO | WO-2005/091946 | | 10/2005 |
| WO | WO-2011/057135 | A3 | 8/2011 |
| WO | WO-2012/061823 | A2 | 5/2012 |
| WO | WO-2012/061823 | A3 | 7/2012 |
| WO | WO2013154349 | | 10/2013 |
| WO | WO2014159542 | | 10/2014 |

OTHER PUBLICATIONS

Sonoda, et al., "Bibliographical Data and Abstract (English Translation)", Japanese Patent Application JP-59-75985, (Apr. 28, 1984),1-2.

Goodenough, J.B. et al., "Fast Na+ -Ion Transport in Skeleton Structures", *Mat. Res. Bull.*, vol. 11, Pergamon Press, Inc. Printed in the United States,(1976),203-220.

Hong, H.Y-P. et al., "Crystal Structures and Crystal Chemistry in the System Na1+xZr2SixP3-x012", *Mat. Res. Bull.*, vol. 11, 1976. Pergamon Press, Inc. Printed in the United States.,(1976),173-186.

Bentzen, J. J., et al., "The preparation and characterization of dense, highly conductive Na5GdSi4O12 nasicon (NGS)", *Materials Research Bulletin*, vol. 15,(1980),1737-1745.

Delmas, C. et al., "Crystal chemistry of the Na1 +xZr2—xLx(PO4)3 (L = Cr, In, Yb) solid solutions", *Materials Research Bulletin*, vol. 16,(1981),285-290.

Von Alpen, V. et al., "Compositional dependence of the electrochemical and structural parameters in the NASICON system (Na1 +xSixZr2P3—xO12)", *Solid State Ionics*, vol. 3/4,(1981),215-218.

Fujitsu, S. et al., "Conduction paths in sintered ionic conductive material Na1 +xYxZr2—x(PO4)3", *Materials Research Bulletin*, vol. 16,(1981),1299-1309.

Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.

Alamo, J. "Chemistry and properties of solids with the [NZP] skeleton", *Solid State Ionics*, vol. 63-65,(1993),547-561.

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1 +xMxZr2—xP3O12(M: Yb, Er, Dy)", *Solid State Ionics*, vol. 84,(1996),61-64.

Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.

Sumathipala, et al., "Novel Li+ Ion Conductors and Mixed Conductors, Li3+xSixCr1—xO4 and a Simple Method for Estimating Li+/e− Transport Numbers", *J. Electrochem. Soc.*, vol. 142, No. 7,(Jul. 1995),2138-2143.

Kowalczk, et al., "Li-air batteries: A classic example of limitations owing to solubilities", *Pure Appl. Chem.*, vol. 79, No. 5,(2007),851-860.

Read, "Characterization of the Lithium/Oxygen Organic Electrolyte Battery", *J. Electrochem. Soc.*, vol. 149, No. 9,(2002),A1190-A1195.

Panero, et al., "High Voltage Lithium Polymer Cells Using a PAN-Based Composite Electrolyte", *J. Electrochem. Soc.*, vol. 149, No. 4,(2002),A414-A417.

Dissanayake, et al., "Lithium ion conducting Li4—2xGe1—xSxO4 solid electrolytes", *Solid State Ionics*, 62,(1993),217-223.

Balagopal, et al., "Selective sodium removal from aqueous waste streams with NaSICON ceramics", *Separation and Purification Technology*, 15,(1999),231-237.

Sagane, et al., "Li+ and Na+ transfer through interfaces between inorganic solid electrolytes and polymer or liquid electrolytes", *Journal of Power Sources*, 146,(2005),749-752.

Wang, et al., "LiTi2(PO4)3 with NASICON-type structure as lithium-storage materials", *Journal of Power Sources*, 124,(2003),231-236.

Dissanayake, et al., "New solid electrolytes and mixed conductors: Li3+xCr1—xMxO4: M = Ge, Ti", *Solid State Ionics*, 76,(1995),215-220.

Kerr, "Polymeric Electrolytes: An Overview", *Lithium Batteries: Science and Technology*, Chapter 19, edited by Nazri and Pistoia, Kluwer Academic Publishers,(2004),574-622.

Young, Lee W., "International Search Report", PCT Search Report for App. No. PCT/US 07/21978, (dated Oct. 10, 2008),1-2.

Young, Lee W., "Written Opinion of the International Searching Authority", PCT Written Opinion for App. No. PCT/US 07/21978, (dated Oct. 10, 2008),1-5.

Fu, "Effects of M3+ Ions on the Conductivity of Glasses and Glass-ceramics in the system Li2O—M2O3—GeO2—P2O5 (M = Al, Ga, Y, Dt, Gd, and La)", *Communications of the American Ceramic Society*, vol. 83, No. 4, (Apr. 2000),104-106.

(56) References Cited

OTHER PUBLICATIONS

Thokchom, et al., "Superionic Conductivity in a Lithium Aluminum Germanium Phosphate Glass-Ceramic", *Journal of the Electrochemical Society*, 155 (12), (Oct. 8, 2008),A915-A920.
Fu, "Fast Li+ Ion Conducting Glass Ceramics in the System Li2O—Al2O3—TiO2—P2O5", *Science Direct, Solid State Ionics*, vol. 104, Issues 3-4, (Dec. 11, 1997),191-194.
Saienga, et al., "The Comparative Structure, Property, and Ionic Conductivity of LiI + Li2S + GeS2 Glasses Doped with Ga2S3 and La2S3", *Journal of Non-Crystalline Solids*, vol. 354, 14, (Mar. 1, 2008),Abstract.
Wang, et al., "Polymer Composite Electrolytes Containing Active Mesoporous SiO2 Particles", *Journal of Applied Physics*, 102, (2007),1-6.
Wang, et al., "Li1.3Al0.3Ti1.7(PO4)3 Filler Effect on (PEO)LiClO4 Solid Polymer Electrode", *Department of Materials Science and Engineering*, Zhejiang University, (2004),Abstract.
Kim, "International Search Report", International App. No. PCT/US2008/084707, (dated Apr. 29, 2009),1-3.
Kim, "Written Opinion of the International Searching Authority", International App. No. PCT/US2008/084707, (dated Apr. 29, 2009),1-4.
Park, Jin "Written Opinion of the International Searching Authority dated Jun. 30, 2009", Int. App. No. PCT/US2008/084572, (Jun. 30, 2009),1-3.
Park, Jin "International Search Report dated Jun. 30, 2009", Int. App. No. PCT/US2008/084572, (Jun. 30, 2009),1-3.
Kim, Jun Hak "Written Opinion of the International Searching Authority dated Aug. 24, 2009", Int. App. No. PCT/US2009/032458, (Aug. 24, 2009),1-4.
Kim, Jun Hak "International Search Report dated Aug. 24, 2009", Int. App. No. PCT/US2009/032458, (Aug. 24, 2009),1-3.
Kim, Yeon-Gyeong "PCT International Search Report", Int. App. No. PCT/US2009/056781, (dated Mar. 2, 2010),1-4.
Kim, Yeon-Gyeong "PCT Written Opinion", Int. App. No. PCT/US2009/056781, (dated Mar. 2, 2010),1-3.
Armand, Michel et al., "ionic-liquid materials for the electrochemical challenges of the future", *Nature Materials*, (Jul. 24, 2009),621-629.
Doyle, Kevin P., et al., "Dentrite-Free Electrochemical Deposition of Li—Na Alloys from an Ionic Liquid Electrolyte", *Journal of the Electrochemical Society*, (May 2006),A1353-A1357.
Kim, K et al., "Electrochemical Investigation of Quaternary Ammonium/Aluminum Chloride Ionic Liquids", *Journal of the Electrochemical Society*, (Jun. 2004),A1168-A1172.
Kim, Ketack et al., "The Role of Additives in the Electroreduction of Sodium Ions in Chloroaluminate-Based Ionic Liquids", *Journal of the Electrochemical Society*, (Dec. 2004),E9-E13.
Lang, Christopher M., et al., "Cation Electrochemical Stability in Chloroaluminate Ionic Liquids", *J. Phys. Chem.*, (2005),19454-19462.
Totsuka, Kazuhide "IPDL Machine Translation of JP08-321322A", IPDL Machine Translation of JP08-321322A, (Mar. 12, 1996),1-10.
Imanaka, Nobuhito "IPDL Machine Translation of JP 2002-245847 A", IPDL Machine Translation of JP 2002-245847 A, (Aug. 30, 2002),1-6.
Wu, Xian Ming et al., "Preparation and characterization of lithium-ion-conductive Li(1.3)Al(0.3)Tl(1.7)(PO4)3 thin films by the solution deposition", *Thin Solid Films* 425, (2003),103-107.
Parsons, Thomas H., "Office Action for U.S. Appl. No. 12/022,381", (dated May 24, 2011),1-11.
Cantelmo, Gregg "Office Action for U.S. Appl. No. 11/944,719", (dated Dec. 27, 2010),1-8.
Kalafut, Stephen J., "Office Action for U.S. Appl. No. 11/871,824", (dated Dec. 10, 2010),1-7.
Kalafut, Stephen J., "Office Action for U.S. Appl. No. 11/871,824", (dated May 25, 2010),1-8.
Apicella, Karie O., "Office Action for U.S. Appl. No. 12/323,165", (dated Jun. 1, 2011),1-10.
Park, Jin "International Search Report", PCT App. No. US2008/084728 Corresponding to U.S. Appl. No. 12/323,165, (dated Jun. 30, 2009),1-3.
Park, Jin "Written Opinion of the International Searching Authority", PCT App. No. US2008/084728 (Corresponding to U.S. Appl. No. 12/323,165 (dated Jun. 30, 2009),1-3.
Inda, Yasushi "Bibliography and Abstract (English Language)", Korean patent application publication KR20040047664, (Jun. 5, 2004),1.
Inda, Yasushi "Bibliography and Abstract (English Language)", Korean Patent Application Publication KR20070028588, (Mar. 12, 2007),1.
Apicella, Karie O., "Final Office Action", U.S. Appl. No. 12/323,165 (dated Sep. 8, 2011),1-11.
Anthony, Julian "Non-Final Office Action", U.S. Appl. No. 12/558,363 (dated Jan. 5, 2012),1-8.
Cullen, Sean P., "Non-Final Office Action", U.S. Appl. No. 12/725,319, (dated Jan. 6, 2012),1-10.
Cullen, Sean P., "Final Office Action", U.S. Appl. No. 12/725,319, (dated Apr. 27, 2012),1-12.
Cho, Jun B., "International Search Report", PCT App. No. US2010/027535 (Corresponding to U.S. Appl. No. 12/725,319, (dated Oct. 20, 2010),1-4.
Cho, Jun B., "Written Opinion of the International Searching Authority", PCT App. No. US2010/027535 (Corresponding to U.S. Appl. No. 12/725,319, (dated Oct. 20, 2010),1-5.
Ryu, et al., "Bibliographical Data and Abstract (English Language)", Application Publication for US2007154814, Corresponding to KR10-0651246, (Aug. 22, 2005),1.
Wiedemann, Eric "Supplementary European Search Report", European Patent Application No. 10754004.9 (Corresponding to U.S. Appl. No. 12/725,319, (dated May 16, 2012),1-6.
Jang, Sung W., "International Search Report", PCT/US2011/046143 (Corresponding to U.S. Appl. No. 13/195,431, (dated Feb. 27, 2012),1-3.
Jang, Sung W., "Written Opinion of the International Searching Authority", PCT/US2011/046143 (Corresponding to U.S. Appl. No. 13/195,431, (dated Feb. 27, 2012),1-3.
Kabe, T. et al., "Hydrodesulfurization and Hydrodenitrogenation", *Wiley-VCH* (1999), (1999),37, 110-112.
Task Force on Strat. UNCNV. Fuel, "America's Strategic Unconventional Fuels, vol. III Resource and Technology Profiles", *America's Strategic Unconventional Fuels, vol. III Resource and Technology Profiles* (completed Feb. 2007, Published Sep. 2007)., Full text available at http://www.unconventionalfuels.org/publications/reports/Volume_III_ResourceTechProfiles(Final).pdf,(Sep. 2007),III-25.
Lee, Dong W., "International Search Report", PCT Application No. PCT/US13/68552 (Corresponding to U.S. Appl. No. 14/072,468), (dated Jan. 24, 2014),1-3.
Yang, Kyung S., "International Search Report", PCT App. No. PCT/US2011/062534 (Corresponding to U.S. Appl. No. 13/307,123, (dated Jul. 24, 2012),1-3.
Yang, Kyung S., "Written Opinion of the International Searching Authority", PCT App. No. PCT/US2011/062534 (Corresponding to U.S. Appl. No. 13/307,123, (dated Jul. 24, 2012),1-3.
Abraham, et al., "A Low Temperature Na—S Battery Incorporating a Soluble S Cathode", *ElectroChimica Acta*, 1978, vol. 23, Pergamon Press Ltd., (Jun. 1, 1978),501-507.
Young, Lee W., "International Search Report", PCT Search Report for App. No. PCT/US 08/10435, (dated Nov. 25, 2008),1-2.
Young, Lee W., "Written Opinion of the International Searching Authority", PCT Written Opinion for App. No. PCT/US 08/10435, (dated Nov. 25, 2008),1-4.
Salminen, Justin et al., "Ionic liquids for rechargeable lithium batteries", *Lawrence Berkeley National Laboratory*, (Sep. 21),1-19.
Cullen, Sean P., "Office Action for U.S. Appl. No. 12/205,759", (dated Sep. 16, 2010),1-22.
Cullen, Sean P., "Office Action for U.S. Appl. No. 12/205,759", (dated Apr. 13, 2011),1-15.
Lee, Kang Young "International Search Report", International App. No. PCT/US2010/055718, (dated Jun. 21, 2011),1-3.

(56) References Cited

OTHER PUBLICATIONS

Lee, Kang Young "Written Opinion", International App. No. PCT/US2010/055718, (dated Jun. 21, 2011),1-3.
Suzuki, et al., "Bibliographical Data and Abstract (English Language)", Japanese Patent application JP62-186470, (Aug. 14, 1987),1-2.
Yun, Cho K., "Internationial Search Report", PCT App. No. PCT/US2012/036959 (corresponding to U.S. Appl. No. 13/466,844), (dated Nov. 23, 2012),1-3.
Yun, Cho K., "Written Opinion of the International Searching Authority", PCT App. No. PCT/US2012/036959 (corresponding to U.S. Appl. No. 13/466,844), (dated Nov. 23, 2012),1-5.
Cullen, Sean P., "Non Final Office Action", U.S. Appl. No. 12/205,759, (dated Apr. 5, 2013),1-17.
Lee, Dong W., "International Serach Report", PCT Application No. PCT/US13/68552 (Corresponding to U.S. Appl. No. 14/072,468, (dated Jan. 24, 2014),1-3.
Lee, Dong W., "Written Opinion of the International Searching Authority", PCT Application No. PCT/US2013/68552 (Corresponding to U.S. Appl. No. 14/072,468, (dated Jan. 24, 2014),1-5.
Lee, Dong W., "International Search Report", PCT Application No. PCT/US13/62386 (Corresponding to U.S. Appl. No. 14/040,241), (dated Dec. 23, 2013),1-3.
Lee, Dong W., "Written Opinion of the International Search Authority", PCT Application No. PCT/US2013/62386 (Corresponding to U.S. Appl. No. 14/040,241), (dated Dec. 23, 2014),1-5.
Lee, Dong W., "International Search Report", PCT Application No. PCT/US2013/058403 (Corresponding to U.S. Appl. No. 14/019,651), (dated Dec. 2, 2013),1-3.
Lee, Dong W., "Written Opinion of the International Searching Authority", PCT Application No. PCT/US2013/058403 (Corresponding to U.S. Appl. No. 14/019,651), (dated Dec. 2, 2013),1-6.
Parsons, Thomas H., "Non Final Office Action", U.S. Appl. No. 13/466,844, (dated Feb. 26, 2015),1-22.
Marks, Jacob B., "Non Final Office Action", U.S. Appl. No. 14/469,865, (dated Apr. 7, 2015),1-6.
Shin, Ju C., "International Search Report", PCT Application No. PCT/US2014/059954 (Corresponding with U.S. Appl. No. 14/511,031), (dated Jan. 20, 2015),1-3.
Shin, Ju C., "Written Opinion of the International Searching Authority", PCT Application No. PCT/US2014/059954 (Corresponding with U.S. Appl. No. 14/511,031), (dated Jan. 20, 2015),1-4.
Jarvi, Tommi "Supplementary European Search Report", European Patent Application No. 12783042.0, (dated Oct. 14, 2014),1-7.
Takeguchi, Yasuhiro "Final Rejection Action", Japanese Patent Application No. 2012-537241, (dated Jun. 17, 2014),1-6.
"Notice of Allowance", Japanese Patent Application 2012-537241, (dated May 11, 2015),1-6.
Masatsugu, Morimitsu "English Lanuage Abstract", JP2008293678, (Dec. 4, 2008),1.
Peramunage, et al., "A Solid Sulfur Cathode for Aqueous Batteries", *Science*, vol. 261, (Aug. 20, 1993),1029-1032.
Marks, Jacob B., "Non-Final Office Action", U.S. Appl. No. 12/940,864, (dated Jun. 18, 2013),1-30.
Marks, Jacob B., "Final Office Action", U.S. Appl. No. 12/940,864, (dated Jan. 29, 2014),1-11.
Marks, Jacob B., "Notice of Allowance", U.S. Appl. No. 12/940,864, (dated Jun. 20, 2014),1-7.
Cain, Edward J., "Non Final Office Action", U.S. Appl. No. 14/072,468, (dated Oct. 5, 2015),1-6.
Quraishi, Kiran "Non-Final Office Action", U.S. Appl. No. 14/040,241, (dated Oct. 28, 2015),1-12.
Colucci, Rios J., "Non-Final Office Action", U.S. Appl. No. 14/019,651, (dated Aug. 17, 2015),1-26.
Akhtar, Kiran Q., "Final Office Action", U.S. Appl. No. 14/040,241, dated May 18, 2016, 1-19.
Cain, Edward J., "Notice of Allowance", U.S. Appl. No. 14/072,468, dated Apr. 28, 2016, 1.7.
Coetzer, et al., "Bibliographic Data:", FR2518320, Jun. 17, 1983.

Colucci Rios, Jose A., "Final Office Action", U.S. Appl. No. 14/019,651, dated Dec. 17, 2015, 1-30.
Colucci Rios, Jose A, "Non Final Office Action", U.S. Appl. No. 14/511,031, dated Apr. 12, 2016, 1-15.
Colucci Rios, Jose A, "Notice of Allowance", U.S. Appl. No. 14/019,651, dated Mar. 31, 2016, 1-7.
Grenness, Morten, "US Publication of", FR2301108, Dec. 20, 1977, 1-8.
Jarvi, Tommi, "European Examination Report", European Patent Application No. 12783042.0, dated Mar. 1, 2016, 1-8.
Kim, Yeon K., "International Search Report", PCT Application No. PCT/US2015/063244, dated Mar. 18, 2016, 1-3.
Kim, Yeon K., "Written Opinion of the International Searching Authority", PCT Application No. PCT/US2015/63244, dated Mar. 18, 2016, 1-3.
Masson, Jean-Pierre, "European Search Report", European Patent Application No. 13842649.9, dated Apr. 26, 2016, 1-8.
Parsons, Thomas H., "Non Final Office Action", U.S. Appl. No. 13/466,844, dated Mar. 23, 2016, 1-15.
Zhang, et al., "A Reveiw of the Electrochemical Performance of Alloy Anodes for Lithium-ion Batteries", Journal of Power Sources, Elsevier SA, CH, vol. 196, No. 1, Jan. 1, 2011, 13-24.
Dunn, Halina, "European Search Report", European Patent Application No. 13834937.8 (Corresponding to U.S. Appl. No. 14/019,651), dated Mar. 18, 2016, 1-7.
Kelly, Michael, "European Search Report", European Patent Application No. 13865228.4, dated Jul. 15, 2016, 1-7.
Kokai, "English Translation", JP 2011-81971, 1-6.
Kokai, "English Translation", JP 2008-300173, 1-8.
Parsons, Thomas H., "Non Final Office Action", U.S. Appl. No. 13/466,844, dated Oct. 7, 2016, 1-13.
Tsuji, Hirosuke, "Final Office Action", Japanese Patent Application No. 2014-510410 (Japanese Version), dated Apr. 5, 2016, 1-4.
Tsuji, Hirosuke, "Final Office Action", Japanese Patent Application No. 2014-510410 (English Translation), dated Apr. 5, 2016, 1-6.
Tsuji, Hirosuke, "Non-Final Office Action", Japanese Patent Application No. 2014-510410 (English Translation), dated Nov. 10, 2015, 1-15.
Tsuji, Hirosuke, "Non-Final Office Action", Japanese Patent Application No. 2014-510410 (Japanese Version), dated Nov. 10, 2015, 1-8.
Unknown, "Notice of Allowance", Japanese Patent Application No. 2014-510410, dated Aug. 9, 2016, 1-4.
Akhtar, Kiran Q., "Final Office Action", U.S. Appl. No. 14/511,031, dated Nov. 3, 2016, 1-12.
Akhtar, Kiran Q., "Non Final Office Action", U.S. Appl. No. 14/040,241, dated Feb. 24, 2017, 1-21.
Gotz, Heide, "European Search Report", European Patent Application No. EP10829189.9, dated Nov. 18, 2016, 1-7.
Unknown, "Examination Report", Australian Patent Application No. 2013364191, dated Apr. 4, 2017, 1-3.
Communication under Rule 71(3) EPC in EP Application No. 13865228.4 dated Jun. 2, 2017 (5 pages).
Examination report No. 1 for standard patent application in AU Application No. 2013364191 dated Apr. 4, 2017 (3 pages).
Final Rejection Office Action in U.S. Appl. No. 12/022,381 dated Oct. 23, 2013 (14 pages).
Final Rejection Office Action in U.S. Appl. No. 12/022,381 dated Dec. 23, 2011 (19 pages).
Final Rejection Office Action in U.S. Appl. No. 12/940,864 dated Jan. 29, 2014 (10 pages).
Final Rejection Office Action in U.S. Appl. No. 13/466,844 dated Aug. 11, 2015 (14 pages).
International Search Report and Written Opinion in International Application No. PCT/US2012/023541 dated Aug. 9, 2012 (8 pages).
International Search Report and Written Opinion in International Application No. PCT/US2012/036959 dated Nov. 23, 2012 (8 pages).
International Search Report and Written Opinion in International Application No. PCT/US2013/058403 dated Dec. 2, 2013 (9 pages).
International Search Report and Written Opinion in International Application No. PCT/US2013/62386 dated Dec. 23, 2013 (8 pages).

(56) References Cited

OTHER PUBLICATIONS

International Search Report and Written Opinion in International Application No. PCT/US2013/68552 dated Jan. 24, 2014 (8 pages).
International Search Report and Written Opinion in International Application No. PCT/US2014/059954 dated Jan. 20, 2015 (7 pages).
International Search Report and Written Opinion in International Application PCT/US2012/023541 dated Aug. 9, 2012 (8 pages).
Non-Final Rejection Office Action in U.S. Appl. No. 12/022,381 dated Sep. 16, 2011 (17 pages).
Non-Final Rejection Office Action in U.S. Appl. No. 12/940,864 dated Jun. 18, 2013 (11 pages).
Non-Final Rejection Office Action in U.S. Appl. No. 13/189,177 dated Sep. 19, 2013 (10 pages).
Non-Final Rejection Office Action in U.S. Appl. No. 13/466,844 dated Feb. 26, 2015 (8 pages).
Non-Final Rejection Office Action in U.S. Appl. No. 14/019,651 dated Aug. 17, 2015 (27 pages).
Non-Final Rejection Office Action in U.S. Appl. No. 14/040,241 dated Oct. 28, 2015 (12 pages).
Non-Final Rejection Office Action in U.S. Appl. No. 14/072,468 dated Oct. 5, 2015 (6 pages).
Non-Final Rejection Office Action in U.S. Appl. No. 14/469,865 dated Apr. 7, 2015 (6 pages).
Notice of Allowance in JP Application No. 2012-537241 dated May 11, 2015 (with English translation) (6 pages).
Notice of Allowance in U.S. Appl. No. 12/940,864 dated Jun. 20, 2014 (7 pages).
Notice of Allowance in U.S. Appl. No. 13/189,177 dated Jan. 8, 2014 (5 pages).
Notice of Preliminary Rejection in KR Application No. 10-2013-7029442 dated Apr. 23, 2018 (17 pages).
Notice of Reasons for Refusal in JP Application No. 2015-549386 dated Aug. 1, 2017 (with English translation) (6 pages).
Notice of Reasons for Rejection in JP Application No. 2012-537241 dated Jun. 17, 2014 (with English translation) (6 pages).
Peramunage, et al., "A Solid Sulfur Cathode for Aqueous Batteries," Aug. 20, 1993, pp. 1029-1032, vol. 261.
Supplementary European Search Report in EP Application No. 12783042.0 dated Oct. 21, 2014 (7 pages).

* cited by examiner

ALKALI METAL ION BATTERY USING ALKALI METAL CONDUCTIVE CERAMIC SEPARATOR

RELATED APPLICATIONS

This application claims the benefit of U.S. Provisional Patent Application Ser. No. 61/484,406 filed May 10, 2011, entitled "Alkali Metal Ion Battery Using Alkali Metal Conductive Ceramic Separator."

This application is also a continuation-in-part of U.S. patent application Ser. No. 12/022,381 filed Jan. 30, 2008, entitled "Battery Using Alkali Ion Conducting Separator."

This application is also a continuation-in-part of U.S. patent application Ser. No. 13/364,169 filed Feb. 1, 2012, which, in turn, is a continuation-in-part of U.S. Pat. No. 8,012,621.

All of these prior patent documents are expressly incorporated herein by reference.

TECHNICAL FIELD

The present embodiments relate to batteries. More specifically, the present embodiments relate to a new type of battery in which the metal that is transported across the separator may be different than the material that is oxidized/reduced at the electrodes.

BACKGROUND

Our society has come to rely on batteries to power a myriad of devices, including computers, cell phones, portable music players, lighting devices, as well as many other electronic components. Nevertheless, there is an ongoing need for further advances in battery technology. For example, there is still a significant need for economical batteries that can power automobiles or provide load-leveling capabilities for wind, solar or other energy technologies. Furthermore, the "information age" increasingly demands portable energy sources that provide lighter weight, higher energy, longer discharge times, more "cycles," and smaller customized designs. To achieve these advances, technologists continue to work to develop batteries with higher and higher energy densities while still providing acceptable safety, power densities, cost, and other needed characteristics.

U.S. Pat. No. 8,012,621, which was filed by Joshi, et. al., is an example of battery technology that is currently being researched. (As noted above, this U.S. patent is expressly incorporated herein by reference.) U.S. Pat. No. 8,012,621 describes a battery cell where a metal hydride is the negative electrode and a nickel hydroxy-oxide electrode is the positive electrode. In both positive and negative electrode chambers, there is an alkaline electrolyte comprised of alkali metal hydroxide dissolved in a water solvent. The patent discloses a substantially nonporous alkali metal ion conductive ceramic membrane to separate the electrode compartments. In this patent, "substantially nonporous" means that at least a portion of the cross-section of the membrane has little or no through porosity such that transport across the membrane primarily must occur through the membrane lattice structure and channels rather than through pores. During operation of the cell described in this patent, an alkali cation carries the charge during charging/re-charging of the battery (rather than the hydroxyl ion that is used as part of the reaction at the electrode). Advantages of this system include a prevention of undesirable species migration from one electrode to another. This patent may also result in improved columbic efficiency as well as negligible self-discharge between cycles and during storage.

Additionally, U.S. patent application Ser. No. 12/022,381 represents another type of battery technology. (This patent application has been published as U.S. Patent Application Publication No. 2009/0189567, and as noted above, this patent application has been expressly incorporated herein by reference.) In U.S. patent application Ser. No. 12/022,381, a battery cell is described in which a zinc negative electrode is utilized with a multitude of different positive electrode materials (such as, for example, $MnO_2$, AgO or $Ag_2O$, NiOOH, $O_2$, HgO, CdO, $Cu_2O$). In all these cases, an alkaline electrolyte is utilized on both sides of the cell, and this alkaline electrolyte is understood to be a water-based material. This system provides the advantage of having a non-porous membrane separating anode and cathode, resulting in high columbic efficiency and a prevention of self discharge.

At the same time, the above-recited patent documents all utilize an aqueous (alkaline) electrolyte. However, there are candidate negative and positive electrode materials that are not compatible with aqueous electrolytes. These aqueous-incompatible electrode materials offer advantages in terms of cyclability, energy density and cost per energy unit. For example, magnesium is a relatively low cost and energy dense electrode material with a very negative reduction potential (relative to hydrogen). In fact, use of a magnesium electrode can result in a very low cost per energy unit when coupled with many candidate electrodes with higher reduction potentials. However, magnesium is not compatible with water since it reacts with water. Aluminum is another low cost electrode material candidate material with similar advantages to magnesium but also is not compatible with an alkaline, water-based electrolyte. Thus, magnesium and aluminum cannot be used as the electrode material in the above-recited systems.

Accordingly, there is a need in the industry for a new type of battery that does not require an aqueous electrolyte and can use materials, such as magnesium and aluminum, as the electrode material. Such a device is disclosed herein.

SUMMARY

The present embodiments may be designed in which the charge carrier that transports across the membrane is a cation that is different from the cation formed/reacted at the surface of the electrode. By having the cation species that moves across the membrane be different than the species involved in the reaction, there is a reduction in the tendency of the cell to form dendrites that may penetrate the membrane. When a metal is formed at the negative electrode upon recharge of the battery, the cation that is used to form the metal may be derived from a salt dissolved in the electrolyte rather than from a cation that has transported across the membrane.

For example, the present embodiments may be designed in which a magnesium or aluminum electrode is used in conjunction with a sodium conductive membrane (such as a NASICON membrane). In this system, sodium ions within the electrolyte will act as a charge carrier that will be transported across the membrane. These sodium ions may be from an alkali metal salt that is dissolved (at least partially) in the electrolyte solution. This alkali metal salt may be, for example, sodium chloride, sodium hydroxide, sodium triflate or the like or combinations thereof. This electrolyte solution may include a solvent. The solvent may be one of many polar organic solvents which do not react with magnesium/aluminum such as propanol, ethylene glycol, glycerine, dimethyl sulfoxide, acetronitrile or combinations of such solvents. Alternatively ionic liquids such as 1-Butyl-3-methylimidazolium hexafluorophosphate (BMIM-PF$_6$) or Trioctylmethylammonium bis(trifluoromethyl-sulfonyl) imide may be used. During discharge of the battery, magnesium/aluminum halide or magnesium/aluminum hydroxide or magnesium/aluminum triflate form as the magnesium/aluminum metal on the electrode surface oxidizes. As part of this process, sodium ions from the electrolyte solution will transport across the membrane. During a recharging reaction, the opposite chemical reactions occur. Rather than having the magnesium/aluminum ions transported across the membrane, such magnesium/aluminum ions are dispersed throughout the negative electrode compartment (within the electrolyte solution). Sodium ions transport across the membrane (and not the magnesium/aluminum ions), thereby reducing the likelihood of dendrite formation. Dendrite formation can be further minimized or impeded by the addition of polymers stable with the electrode material and solvent, for example polytetrafluoroethylene (PTFE), Polyvinylidene Fluoride (PVDF) or the like.

Examples of a negative or first electrode discharge reaction (using magnesium as the example) are given below. During this discharge reaction, the metal is oxidized into an ionic state:

$$Mg+2NaOH \text{ or } 2NaCl \rightarrow MgCl_2 \text{ or } Mg(OH)_2+2Na^+ + 2e^-.$$

More generalized, these reactions can be written as follows:

$$A+2MeX \rightarrow AX_2+2Me^++2e^- \text{ (where A is a divalent metal), or}$$

$$A+MeX \rightarrow AX+Me^++e^- \text{ (where A is a monovalent metal), or}$$

$$A+3MeX \rightarrow AX_3+3Me^++3e^- \text{ (where A is a trivalent metal).}$$

If A is a divalent metal, this metal at the first electrode forms divalent cations upon oxidation (such as Mg, Ca, Zn or Be). If A is a monovalent metal, this metal at the first electrode forms monovalent cations upon oxidation (such as Li, Na, and K). If A is a trivalent metal, this metal at the first electrode forms trivalent cations upon oxidation (such as Al). Me is the alkali metal and MeX is the alkali metal salt, Me$^+$ is the alkali metal ion that may conduct through the membrane, and X is the anion which may be a halide, or hydroxyl ion.

Examples of a negative or first electrode recharge reaction (using magnesium as the example) are given below. During this recharge reaction, the metal is regenerated.

$$MgCl_2 \text{ or } Mg(OH)_2+2Na^++2e^- \rightarrow Mg+2NaOH \text{ or } 2NaCl.$$

More generalized, these reactions can be written as follows:

$$AX_2+2Me^++2e^- \rightarrow A+2MeX \text{ (where A is a divalent metal), or}$$

$$AX+Me^++e^- \rightarrow A+MeX \text{ (where A is a monovalent metal), or}$$

$$AX_3+3Me^++3e^- \rightarrow A+3MeX \text{ (where A is a trivalent metal).}$$

Of course, in an electrolytic cell, there must be a positive or second electrode that is used with the first electrode. A variety of different materials may be used as the second electrode, including sulfur, iodine, chloride, etc. During discharge, some of these reactions may be written as follows:

$$3S+2Na^++2e^- \rightarrow Na_2S_3;$$

$$I_2+2Na^++2e^- \rightarrow 2NaI;$$

$$NiCl_2+2Na^++2e^- \rightarrow 2NaCl+Ni;$$

$$S+H_2O+2e^- \rightarrow OH^-+HS^-; \text{ or}$$

$$NiO_2+H_2O+e^- \rightarrow NiOOH+OH^-$$

The first three of these second electrode reactions do not require the presence of water. Accordingly for these reactions, polar organic solvents or ionic liquids may be used to at least partially dissolve the forming salt (e.g., Na$_2$S$_3$, NaI, or NaCl). Ethylene glycol and N-methyl formamide, dimethyl sulfoxide, etc., are examples of solvents which effectively dissolve the salt, but are not water-based. In the last two electrode reactions indicated above, water may be used as the solvent. In fact, in such reactions, water is used as a reactant to form hydroxyl ion that is part of the chemical reaction occurring at the electrode. Of course many other electrode materials may be used for the positive or second electrode including MnO$_2$, AgO, Ag$_2$O, O$_2$, CdO, Cu$_2$O, FeS$_2$.

It should be noted that the present embodiments may provide an advance with respect to the use of magnesium and/or aluminum in batteries. For example, batteries using magnesium were difficult to use because the magnesium ions often caused a failure to occur at the cathode. Specifically, the magnesium ions may be incompatible with the cathode solvent, may form undesirable compounds at the cathode, and/or may be inculcated (incorporated) into the electrode or the membrane, etc. However, the present embodiments address the difficulty associated with magnesium ions at the cathode by essentially converting the system into one that uses sodium ions, rather than magnesium ions, at the cathode. In other words, it is sodium ions, not magnesium ions, that will transport across the membrane and will be reacted at the cathode. Thus, the cathode is separated from magnesium ions, thereby making the cell less prone to failure and/or less prone to the problems associated with the use of magnesium ions at the cathode.

DETAILED DESCRIPTION

Figure 1:
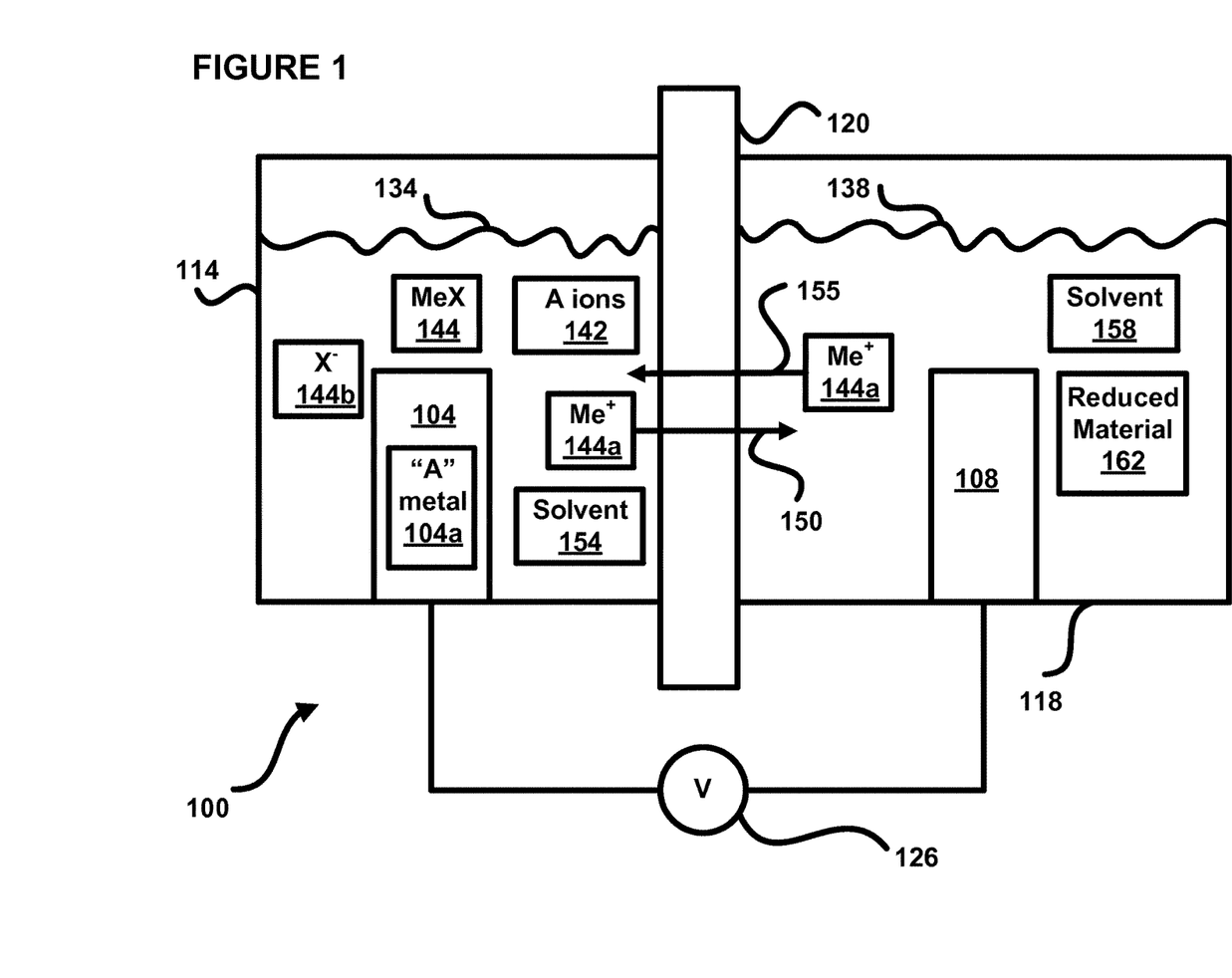
FIG. 1 is schematic diagram of an embodiment of a cell.

Referring now to FIG. 1, a schematic view of a battery 100 according to the present embodiments is illustrated. As shown in FIG. 1, the battery 100 includes a first electrode 104 and a second electrode 108. The first electrode 104 may be housed within a first compartment 114 and the second electrode 108 may be housed within a second compartment 118. The first compartment 114 and the second compartment 118 may be separated by a separator 120. As known in the art, the first electrode 104 and the second electrode 108 may be connected to a voltage source 126. When connected to the voltage source, the battery 100 may either be operated in a charging or recharging mode. Those skilled in the art will appreciate how to construct the battery 100 so that it may be discharged (and thus produce a voltage) or may be charged (and thus receive the voltage to recharge the system).

The separator 120 that is used in the battery 100 may be an alkali-ion conductive substantially non-porous separator 120 that is disposed between the first and second electrodes 104, 108. As used herein, the term "substantially nonporous" means that at least a portion of the cross-section of the separator 120 has little or no through porosity such that transport across the separator 120 primarily must occur through the separator's lattice structure and channels rather than through pores. Because the separator 120 is "alkali-ion conductive," alkali metal ions (such as, for example, sodium ions, lithium ions, potassium ions, etc.) may pass through the separator 120. In other words, the alkali metal ions may pass through the separator 120 from the first compartment 114 to the second compartment 118 (and vice versa). Generally, the separator 120 will be a "specific alkali ion conductor," meaning that it is specifically designed to transport a certain, specific alkali metal ion across the membrane (such as, for example, specifically transporting sodium ions across the separator 120, specifically transporting lithium ions across the separator, etc.).

In some embodiments, the separator 120 is a substantially non-porous, electronically insulating, ceramic separator material. In other embodiments, the separator 120 is a substantially non-porous glass separator material. In other embodiments, the separator 120 comprises a material having the formula $Me_{1+x}Zr_2Si_xP_{3-x}O_{12}$ where $0.1 \leq x \leq 3$, where Me is Na, K, or Li. In further embodiments, the separator 120 comprises a material having the formula $Na_{1+x}Zr_2Si_xP_{3-x}O_{12}$ where $0.1 \leq x \leq 3$. Yet additional embodiments may be made in which the separator 120 comprises a material having the formula $Me_5RESi_4O_{12}$ where Me is Na, K, or Li, where RE is Y, Nd, Dy, or Sm, or any mixture thereof. Other embodiments are designed in which the separator 120 comprises a non-stoichiometric alkali-deficient material having the formula $(Me_5RESi_4O_{12})_{1-\delta} \cdot (RE_2O_3 \cdot 2SiO_2)_\delta$, where Me is Na, K, or Li, where RE is Nd, Dy, or Sm, or any mixture thereof and where $\delta$ is the measure of deviation from stoichiometry. Additional embodiments may be designed in which the separator 120 comprises a material with the formula $Li_{1+x}Al_xTi_{2-x}(PO_4)_3$ or $Li_{1.3}Al_{0.3}Ti_{1.7}(PO_4)_3$. It should be noted that regardless of the particular material used to construct the separator 120, this separator 120 may be a monolithic flat plate, a monolithic tube, a monolithic honeycomb, or supported structures of the foregoing. In further embodiments, the separator 120 may comprise a layered alkali ion conducting ceramic-polymer composite membrane. This type of ceramic-polymer composite membrane may comprise alkali ion-selective polymers layered on alkali ion conducting ceramic solid electrolyte materials. Yet additional embodiments may be designed in which the separator 120 is a NaSICON, KSICON or LiSICON membrane obtained from Ceramatec, Inc., which is located in Salt Lake City, Utah. Other types of alkali-ion conductive substantially non-porous separators may also be used in the present embodiments.

In some embodiments, the separator 120 is selected from the group consisting of a glass separator material, an electronically insulating, ceramic separator material, and a layered alkali ion conducting ceramic-polymer composite membrane comprising alkali ion-selective polymers layered on alkali ion conducting ceramic solid electrolyte material.

The first and second electrodes 104, 108 will now be described. The first electrode 104 comprises a metal. This metal is designed as metal "A" 104a. This metal may be, for example, magnesium or aluminum. More generally, the metal may be Li, Na, Mg, Al, Zn, Ca, Fe, Zn, Be or K. During discharge of the battery 100, the metal at the first electrode 104 will be converted from its metallic state to its ionic state. These reactions may be represented as follows:

$A + 2MeX \rightarrow AX_2 + 2Me^+ + 2e^-$ (where A is a divalent metal), or $A + MeX \rightarrow AX + Me^+ + e^-$ (where A is a monovalent metal), or $A + 3MeX \rightarrow AX_3 + 3Me^+ + 3e^-$ (where A is a trivalent metal).

For example, if magnesium is the metal, this discharge reaction may be written as follows:

$Mg + 2NaOH$ or $2NaCl \rightarrow MgCl_2$ or $Mg(OH)_2 + 2Na^+ + 2e^-$.

As noted above, the battery 100 may also be recharged. During this recharge reaction, the metal is regenerated.

$AX_2 + 2Me^+ + 2e^- \rightarrow A + 2MeX$ (where A is a divalent metal), or $AX + Me^+ + e^- \rightarrow A + MeX$ (where A is a monovalent metal), or $AX_3 + 3Me^+ + 3e^- \rightarrow A + 3MeX$ (where A is a trivalent metal).

For example, if magnesium is the metal, this recharging reaction may be written as follows:

$MgCl_2$ or $Mg(OH)_2 + 2Na^+ + 2e^- \rightarrow Mg + 2NaOH$ or $2NaCl$.

As described herein, the charging/discharging reactions of the first electrode 104 will produce or consume ions of the metal 104a. These ions are present in the first compartment 114 (as shown by "A" ions 142). More specifically, as shown in FIG. 1, a first electrolyte 134 is present in the first compartment 114 (proximate the first electrode 104) and the ions that are produced/consumed during the reactions of the first electrode 104 constitute part of this first electrolyte 134. The first electrolyte 134 contacts the first electrode 104.

The first electrolyte 134 also comprises a quantity of an alkali metal salt, as represented in FIG. 1 as MeX 144. This alkali metal salt may be an alkali metal halide, an alkali metal hydroxide, an alkali metal triflate, etc. Of course, this MeX may actually disassociate into $Me^+$ ions and $X^-$ ions. Accordingly, for purposes of clarity, FIG. 1 also shows quantities of $Me^+$ ions 144a and $X^-$ ions 144b. As explained herein, the alkali metal $Me^+$ may be conducted through the separator 120 during the discharging reaction (as indicated by arrow 150) so that it can access the second compartment 118.

The first electrolyte 134 may also comprise a solvent 154, such as a polar solvent. The salt MeX 144, as well as the ions 142, 144a, 144b, will be at least partially soluble in the solvent 154. In some embodiments, the solvent is designed such that it will not react with metal ions ("A" ions). In some embodiments, the solvent may be propanol, ethylene glycol, glycerine, dimethyl sulfoxide, acetonitrile or combinations of such solvents. Alternatively ionic liquids such as 1-Butyl-3-methylimidazolium hexafluorophosphate (BMIM-PF$_6$) or Trioctylmethylammonium bis(trifluoromethyl-sulfonyl) imide may be used as the solvent 154.

The second electrode 108 will now be described. The second electrode 108 comprises an oxidized material that is capable of being electrochemically reduced by the metal of the first electrode 104 (during the discharging reaction). A variety of different materials may be used as the material for the second electrode 108. For example, embodiments may be constructed in which one or more of the following materials are used as the second electrode:

$MnO_2$; AgO; $Ag_2O$; $FeS_2$; $O_2$; NiOOH; $NiCl_2$; HgO; CdO; and $Cu_2O$.

A second electrolyte 138 will also be positioned within the second compartment 118 (proximate the second electrode 108.) The second electrolyte 138 contacts the second electrode 108. This second electrolyte 138 will at least partially dissolve the reduced material 162 that is being produced as part of the electrochemical reduction reaction (which is designated as Reduced Material 162 in FIG. 1). In order to facilitate such dissolving of the reduced material 162, the second electrolyte 138 may comprise a solvent 158 (such as a polar solvent). In some embodiments, the second electrolyte 138 may comprise the same materials/chemicals that are used to construct the first electrolyte 134. However, in other embodiments the first electrolyte 134 and the second electrolyte 138 may comprise different materials/chemicals. Examples of the chemicals that may be used as the second solvent 158 include propanol, ethylene glycol, glycerine, dimethyl sulfoxide, acetronitrile or combinations of such solvents. Alternatively ionic liquids such as 1-Butyl-3-methylimidazolium hexafluorophosphate ($BMIM-PF_6$) or Trioctylmethylammonium bis(trifluoromethyl-sulfonyl) imide may be used as the second solvent 158.

The second electrolyte 138 may further comprise a quantity of the alkali metal ions ($Me^+$) 144a. These ions 144a may be conducted through the separator 120 (such as, for example, during a recharging reaction in which the reduced material 162 is oxidized back onto the second electrode 108 and alkali metal ions are produced). This conduction of the ions 144a through the separator 120 is shown by arrow 155.

It should be noted that in some embodiments, the metal that is used as the "A" metal 104a of the first electrode 104 is not an alkali metal. For example, the "A" metal 104a may be magnesium or aluminum. In such embodiments, the "A" ions 142 that are produced/consumed during the charging/discharging of the battery 100 are not the ions that will be transported across the separator 120. Rather, alkali metal ions 144a are transmitted across the separator 120. Such alkali metal ions 144a are not reacted at the electrodes 104, 108 during charging or recharging. Having the materials at the electrodes be different than the alkali metal that flows across the separator 120 may be advantageous in that it limits or reduces the possibility of dendrite formation. Specifically, because the materials that are oxidized/reduced at the electrodes do not "flow" into another compartment, the likelihood that such materials will form a dendrite that penetrates the separator 120 is substantially reduced and/or eliminated.

Figure 2:
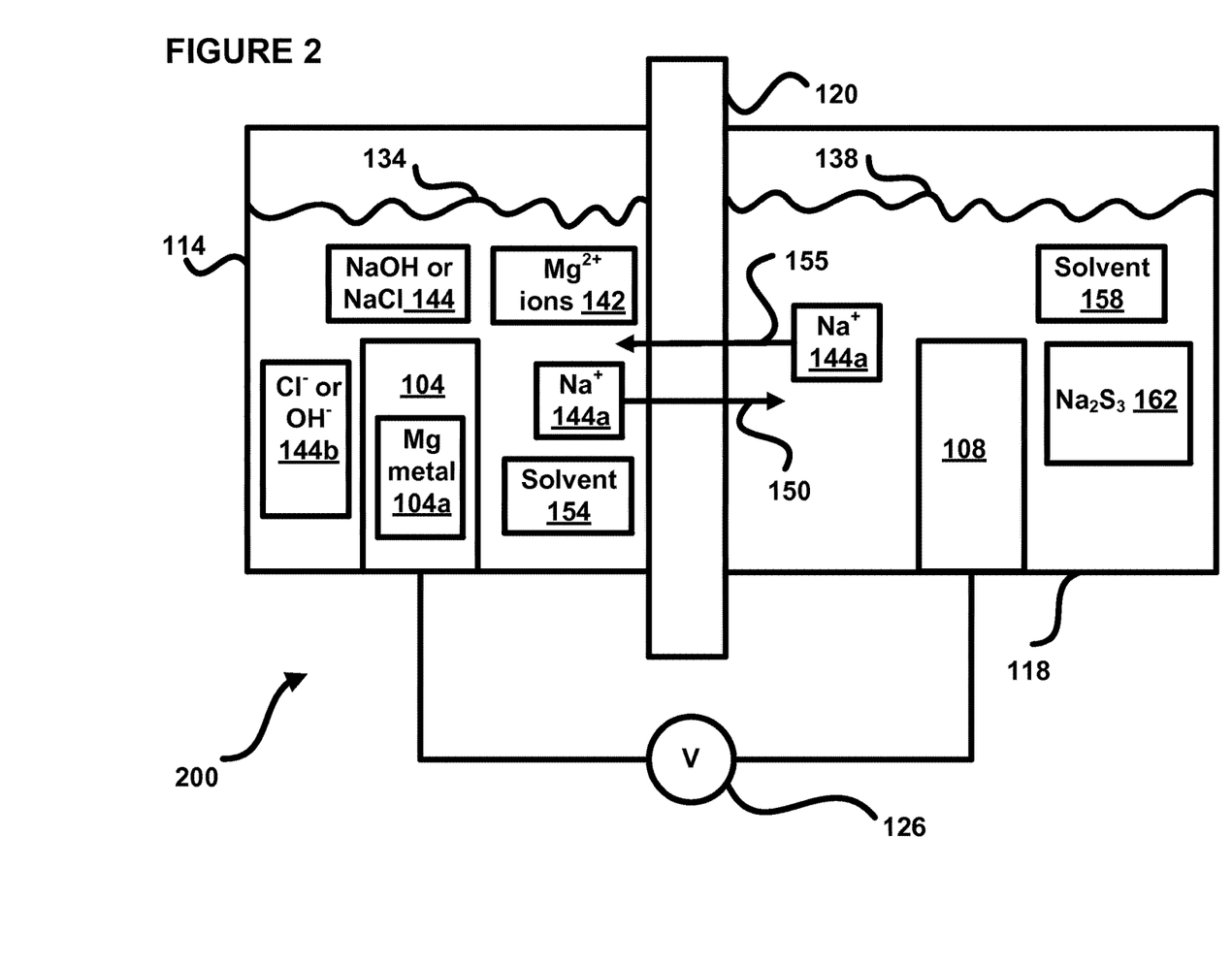
FIG. 2 is a schematic diagram of a cell in which magnesium is used at the first electrode and sulfur is used at the second electrode.

Referring now to FIG. 2, another example of a battery 200 is shown. The battery 200 is similar to the battery 100 of FIG. 1. However, the difference between FIG. 1 and FIG. 2 is that the battery 200 provides a specific example of the materials used in the battery cell. Specifically, in the embodiment of FIG. 2, the "A" metal used as the first electrode 104 is magnesium and the alkali metal salt 144 is NaCl or NaOH. (In other words, the metal used in the electrode is Mg metal 104a.) The alkali metal ions 144a are sodium ions while the ions 144b are either $OH^-$ ions or $Cl^-$ ions. $Mg^{2+}$ ions 142 are formed from the oxidation reaction at the first electrode 104. The separator 120 is a material that may conduct sodium ions across the separator 120, such as, for example, a NaSICON membrane available from the Ceramatec, Inc., company of Salt Lake City, Utah. (In this system, $2Na^+$ ions may transport across the NaSICON membrane for every $Mg^{2+}$ ion formed.) The solvent 154 is selected such that NaOH or NaCl (and the $Na^+$, $OH^-$, $Cl^-$ and $Mg^{2+}$ ions) will at least partially dissolve in the solvent.

The discharge and charge reactions of this Mg system are summarized below:

Discharge:

Charge:

With respect to the second electrode 108, this electrode 108 may be a sulfur electrode that reacts according to the following equations:

Discharge:

Charge:

In this embodiment, the "reduced material" that is formed upon the oxidation of the magnesium metal is $Na_2S_3$ 162. The solvent 158 is selected such that it will at least partially dissolve the formed $Na_2S_3$.

This particular battery 200 has significant advantages. For example, the use of Mg metal is desirable as this material is very inexpensive and provides a good electric potential and battery performance. Also, the Mg may be used in the battery 200 because there is no water (or very minimal water) in the system. Further, the $Mg^{2+}$ ions that are formed upon oxidation of the first electrode 104 are not transported across the separator 120; rather, it is the sodium ions 144a 144a that are carried across the NaSICON membrane.

Additionally, the present battery 200 shown in FIG. 2 provides a significant voltage potential. For example, a voltage of 1.77 V could be obtained during discharge (depending upon the concentrations of the relevant species).

Figure 3:
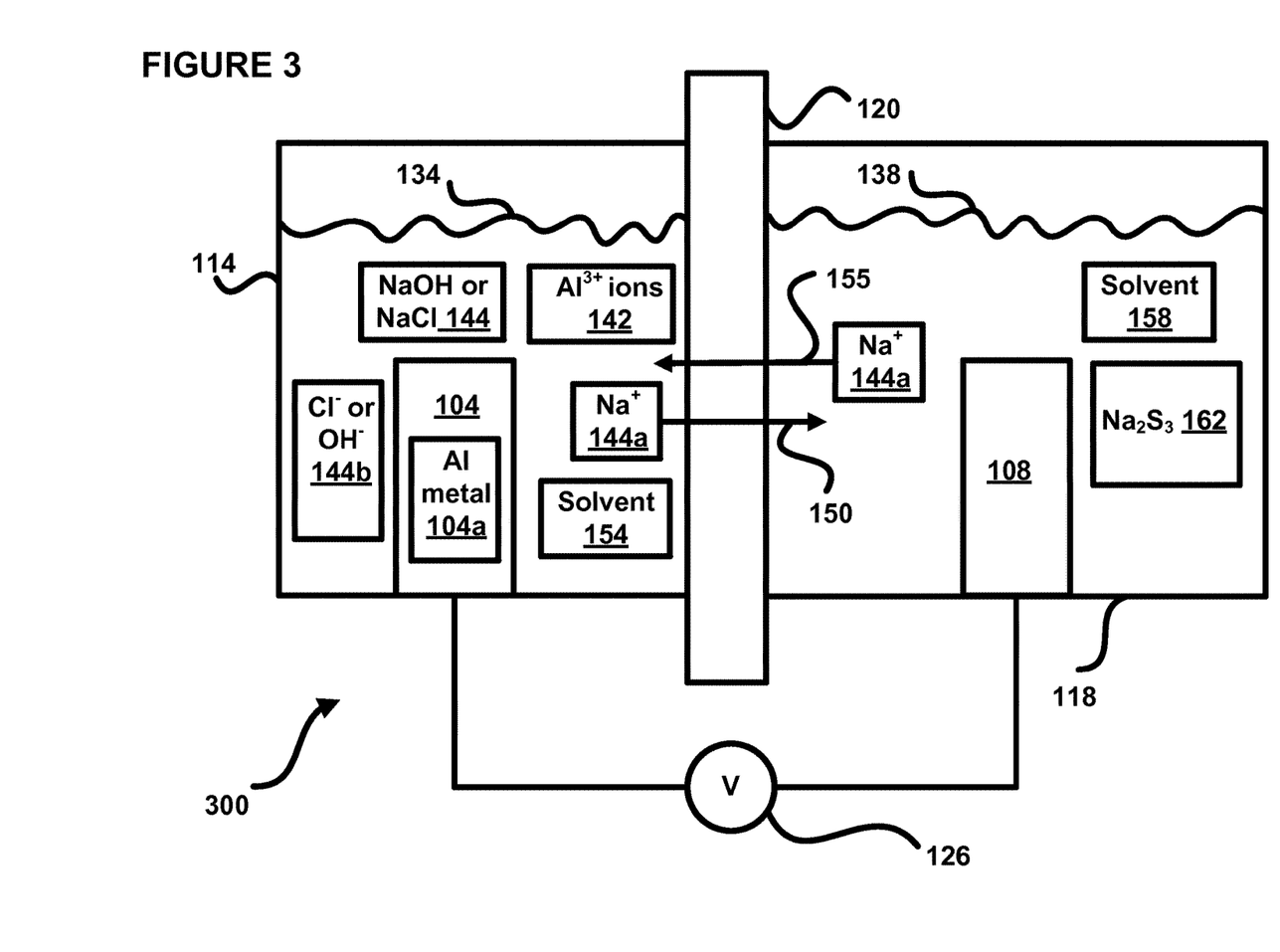
FIG. 3 is a schematic diagram of a cell in which aluminum is used at the first electrode and sulfur is used at the second electrode.

Referring now to FIG. 3, another example of a battery 300 is shown. The battery 300 is similar to the battery 200 of FIG. 2. However, in the embodiment of FIG. 3, the "A" metal used as the first electrode 104 is aluminum and the alkali metal salt 144 is NaCl or NaOH. (In other words, the metal of the first electrode is Al metal 104a.) $Al^{3+}$ ions 142 will be found in the first electrolyte 134. Thus, the ions 144b are either $OH^-$ ions or $Cl^-$ ions. $Al^{3+}$ ions are formed from the electrode 104. The alkali metal ions 144a are sodium ions. The separator 120 is a material that may conduct sodium ions across the separator 120, such as, for example, a NaSICON membrane available from the Ceramatec, Inc., company of Salt Lake City, Utah. (In this system, $3Na^+$ ions may transport across the membrane for every $Al^{3+}$ ion formed during the discharging reaction.) The solvent 154 is selected such that NaOH or NaCl (and the $Na^+$, $OH^-$, $Cl^-$ and $Al^{3+}$ ions) will at least partially dissolve in the solvent.

The discharge and charge reactions of this Al system are summarized below:

Discharge:

$$Al + 3NaOH \text{ or } 3NaCl \rightarrow AlCl_3 \text{ or } Al(OH)_3 + 3Na^+ + 3e^-$$

Charge:

$$AlCl_3 \text{ or } Al(OH)_3 + 3Na^+ + 3e^- \rightarrow Al + 3NaOH \text{ or } 3NaCl$$

With respect to the second electrode 108, this electrode 108 may be a sulfur electrode that reacts according to the following equations:

Discharge:

$$4.5\ S + 3Na^+ + 3e^- \rightarrow 1.5\ Na_2S_3$$

Charge:

$$1.5 Na_2S_3 \rightarrow 4.5S + 3Na^+ + 3e^-$$

Thus, in this embodiment, the "reduced material" that is formed upon the oxidation of the magnesium metal is $Na_2S_3$ 162. The solvent 158 is selected such that it will at least partially dissolve the formed $Na_2S_3$.

This particular battery 300 has significant advantages. For example, the use of Al metal is desirable as this material is very inexpensive and provides a good electric potential and battery performance. Also, the Al may be used in the battery because there is no water (or very minimal water) in the system. Further, the Al ions that are formed upon oxidation of the first electrode 104 are not transported across the separator 120; rather, it is the sodium ions 144a that are carried across the membrane.

Additionally, the present battery 300 shown in FIG. 3 provides significant voltage potential. For example, a voltage of 1.05 V could be obtained during discharge (depending upon the concentrations of the species).

Referring now to all of the Figures generally, the present embodiments also provide for a method of charging or discharging a battery. Specifically, a battery is obtained, which may be any of the batteries 100, 200, 300 described herein. The charging of the battery will occur when an electric charging potential (voltage) is supplied by the source 126. This application of the potential causes the following reactions to occur:

if A is a divalent metal: $AX_2 + 2Me^+ + 2e^- \rightarrow A + 2MeX$;

if A is a trivalent metal: $AX_3 + 3Me^+ + 3e^- \rightarrow A + 3MeX$; and if A is a monovalent metal: $AX + Me^+ + e^- \rightarrow A + MeX$.

Additionally, wherein applying the electric charging potential also causes oxidation at the second electrode 108 resulting in the release of alkali metal ions, $Me^+$, from the solvent 158 and conducting $Me^+$ ions 144a across the alkali ion conducting separator 120 from the second electrode 108 to the first electrode 104.

The present embodiments also provide for a method of discharging a battery. Specifically, a battery is obtained, which may be any of the batteries 100, 200, 300 described herein. As part of the discharging process, an electric potential between the first and second electrodes 104, 108 is generated at least in part due to the following reaction occurring at the first electrode 104:

$A + 2MeX \rightarrow AX_2 + 2Me^+ + 2e^-$, if A is a divalent metal, $A + MeX \rightarrow AX + Me^+ + e^-$, if A is a monovalent metal, $A + 3MeX \rightarrow AX_3 + 3Me^+ + 3e^-$, if A is a trivalent metal.

Additionally, generation of the electric potential also causes reduction at the second electrode 108 resulting in anions which form salts with alkali metal ions, $Me^+$; and resulting in conducting $Me^+$ ions across the alkali ion conducting separator 120 from the first electrode 104 to the second electrode 108.

A method of inhibiting dendrite formation is also taught herein. This method involves obtaining a battery. This battery may be any of the batteries 100, 200, 300 taught herein. The batteries 100, 200, 300 may have a first electrode 104 comprising metal and a second electrode 108 comprising an oxidized material capable of electrochemical reduction by the metal. The method further comprises the step of disposing an alkali-ion conductive, substantially non-porous separator 120 disposed between the first and second electrodes and where a first electrolyte 134 contacting the first electrode 104 comprised of a polar solvent 154 which is non-reactive with the metal and a salt bearing the alkali-ion where the salt is at least partially soluble in the polar solvent 154, and second electrolyte 138 contacting the second electrode 108, the second electrolyte 138 comprising a solvent 158 which at least partially dissolves the alkali salt that forms upon reduction of the second electrode.

As described in the systems of FIGS. 1-3, the present embodiments may provide advantages over previous batteries that use magnesium and/or aluminum-type at the cathode. For example, batteries using magnesium at the cathode can be difficult to implement because the magnesium ions may cause the cathode to fail (and thus, fail the battery). Specifically, the magnesium ions may be incompatible with the solvent used in the cathode side, may react to form undesirable compounds at the cathode, and/or may be inculcated (incorporated) into the electrode or the membrane, etc., thereby failing the system. However, the present embodiments address the difficulty associated with magnesium ions at the cathode by essentially converting the system into one that uses sodium ions, rather than magnesium ions, at the cathode. In other words, it is sodium ions, and not magnesium ions, that will transport across the membrane and will be reacted at the cathode. (In fact, in some embodiments, the cathode may be essentially free of magnesium/ magnesium ions.) Thus, the cathode system is separated from magnesium ions, thereby reducing the likelihood that the magnesium ions will react with the cathode, will be incompatible with the cathode solvent, etc. Accordingly, the cell, as a whole, may be less prone to failure.

Examples

Figure 4:
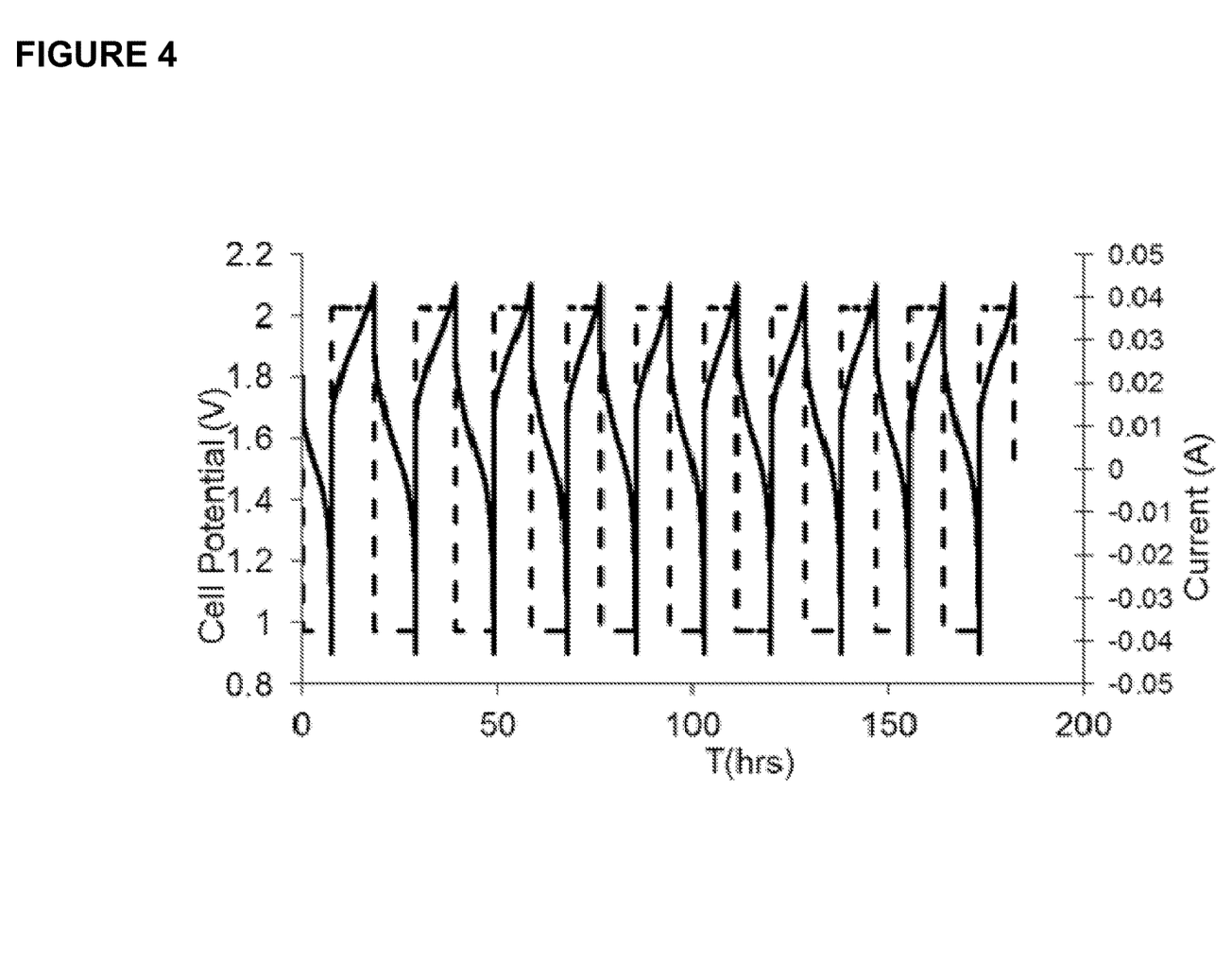
FIG. 4 is a graph of cell voltage over time with respect to a cell having Zn/Zn(OH)$_2$ at one electrode and Ni(OH)$_2$/NiOOH at the other electrode.

A Zn/Zn(OH)$_2$ anode was utilized with sodium hydroxide electrolyte, while at the cathode, Ni(OH)$_2$/NiOOH was utilized also with sodium hydroxide electrolyte. A nonporous NaSICON sodium ion conducting membrane separated anode from cathode. FIG. 4 shows a plot of cell voltage as the current was cycled between an initial discharge then repeated charging/discharging processes. The membrane is only conductive to sodium ions so the ionic current was carried by sodium ions while sodium ions did not participate in either anode or cathode reactions.

What is claimed is:
1. A battery comprising:
a first electrode comprising a first metal that is electrochemically oxidized during discharge of the battery to form first metal ions, wherein the first metal is not an alkali metal;

a second electrode comprising an oxidized material that is electrochemically reduced by the first metal of the first electrode during discharge of the battery;

an alkali-ion conductive, substantially non-porous separator disposed between the first and second electrode, wherein the separator selectively conducts alkali metal ions as charge carriers in the battery, and wherein the separator does not conduct first metal ions and does not conduct ions of the oxidized material that is electrochemically reduced;

a first electrolyte contacting the first electrode, the first electrolyte comprising: a first solvent which is non-reactive with the first metal; and a salt of an alkali metal ion that is at least partially soluble in the first solvent;

a second electrolyte contacting the second electrode, wherein the second electrolyte comprises a second solvent that at least partially dissolves an alkali metal salt that forms as the oxidized material is electrochemically reduced.

2. The battery according to claim 1, wherein the separator is a solid alkali metal ion conducting material, wherein the alkali metal is Na, K, or Li.

3. The battery according to claim 1, wherein the second electrode comprises $I_2$.

4. The battery according to claim 1, wherein the second electrode comprises one of the following: $MnO_2$; AgO; $Ag_2O$; $FeS_2$; $O_2$; NiOOH; $NiCl_2$; HgO; CdO; or $Cu_2O$.

5. The battery according to claim 1, wherein the first electrolyte and the second electrolyte comprise the same solvent.

6. The battery according to claim 1, wherein the first metal comprises aluminum or magnesium.

7. A rechargeable battery comprising:

a first compartment comprising a first electrode, the first electrode comprising a first metal that is electrochemically oxidized to form first metal ions during discharge of the battery and is electrochemically reduced to form the first metal during recharge of the battery, wherein the first metal is not an alkali metal;

a second compartment comprising a second electrode, the second electrode comprising an oxidized material that is electrochemically reduced by the first metal during discharge of the battery to form a reduced material, wherein the reduced material is electrochemically oxidized during recharge of the battery;

a charge carrier comprising alkali metal ions, wherein the charge carrier is transported from the first compartment to the second compartment during discharge and wherein the charge carrier is transported from the second compartment to the first compartment during recharge; and an alkali ion selective, substantially non-porous separator configured to divide the first compartment from the second compartment, wherein the separator is configured to selectively conduct the charge carrier alkali metal ions.

8. The rechargeable battery of claim 7 further comprising a first electrolyte disposed in the first compartment, wherein the first electrolyte comprises a first solvent that is non-reactive with the first metal.

9. The rechargeable battery of claim 8 further comprising a second electrolyte disposed in the second compartment, wherein the second electrolyte comprises a second solvent that at least partially dissolves the reduced material.

10. The rechargeable battery of claim 8 wherein the first solvent comprises one or more of a polar solvent or an ionic liquid.

11. The rechargeable battery of claim 8 wherein the second solvent comprises one or more of a polar solvent or an ionic liquid.

12. The rechargeable battery of claim 7 wherein the alkali metal ions comprise one or more of sodium ions, potassium ions, or lithium ions.

13. The rechargeable battery of claim 7 wherein the first metal comprises one or more magnesium, or aluminum.

14. The rechargeable battery of claim 7 wherein the oxidized material comprises one or more of S, $I_2$, $NiCl_2$, $NiO_2$, AgO, $Ag_2O$, $O_2$, CdO, CuO, or $FeS_2$.

* * * * *